United States Patent
Joynes et al.

(10) Patent No.: US 9,994,054 B2
(45) Date of Patent: Jun. 12, 2018

(54) GENERATING AN IDENTITY DOCUMENT WITH PERSONALIZATION DATA AND UNIQUE MACHINE DATA

(71) Applicant: Entrust Inc., Dallas, TX (US)

(72) Inventors: Mark Andrew Joynes, Pakenham (CA); Gregory James Wetmore, Ottawa (CA); Gordon William Coulson, Ottawa (CA); Sharon Marie Boeyen, Stittsville (CA)

(73) Assignee: Entrust, Inc., Dallas, TX (US)

( * ) Notice: Subject to any disclaimer, the term of this patent is extended or adjusted under 35 U.S.C. 154(b) by 64 days.

(21) Appl. No.: 14/828,949

(22) Filed: Aug. 18, 2015

(65) Prior Publication Data
US 2016/0052322 A1  Feb. 25, 2016

Related U.S. Application Data (60) Provisional application No. 62/039,147, filed on Aug. 19, 2014.

(51) Int. Cl.
*B41M 3/14* (2006.01)
*G06K 1/12* (2006.01)
(Continued)

(52) U.S. Cl.
CPC ............... *B41M 3/14* (2013.01); *G06K 1/121* (2013.01); *G06K 17/00* (2013.01); *G06K 19/06* (2013.01);
(Continued)

(58) Field of Classification Search
CPC ............. H04N 1/32144; G07F 7/1008; G06K 9/00577; G06K 19/14; G06K 19/06037;
(Continued)

(56) References Cited

U.S. PATENT DOCUMENTS 7,555,650 B1 * 6/2009 Zhao ................ H04N 21/23892
380/200
2003/0089764 A1 * 5/2003 Meadow ............. G06Q 20/341
235/375
(Continued)

FOREIGN PATENT DOCUMENTS

EP  0412520 A2  2/1991
EP  0599558 A2  6/1994

OTHER PUBLICATIONS

European Patent Office; International Search Report and Written Opinion; International Application No. PCT/US2015/045838; dated Nov. 18, 2015.

*Primary Examiner* — Sonji Johnson
(74) *Attorney, Agent, or Firm* — Faegre Baker Daniels LLP (57) ABSTRACT

An apparatus and methods for generating an identity document obtain unique machine data related to an identity document generation system. The apparatus and methods obtain personalization data related to an intended holder of the identity document. The apparatus and methods generate a unique machine and personalization data object that includes values of the unique machine data and the personalization data. The apparatus and methods digitally sign the unique machine and personalization data object. The apparatus and methods incorporate the signed unique machine and personalization data object into the identity document.

22 Claims, 4 Drawing Sheets

(51) Int. Cl.
*G06K 19/06* (2006.01)
*G06K 19/07* (2006.01)
*G06K 17/00* (2006.01)
*G07C 9/00* (2006.01)

(52) U.S. Cl.
CPC ... *G06K 19/06037* (2013.01); *G06K 19/0723* (2013.01); *G07C 9/00007* (2013.01); *G06K 2017/0041* (2013.01)

(58) Field of Classification Search
CPC .... G06K 1/121; G06K 19/0723; G06K 19/06; G06K 17/00; G06K 2017/0041; G07D 7/2033; B41M 3/14; G07C 9/00007
See application file for complete search history.

(56) References Cited

U.S. PATENT DOCUMENTS

| | | |
|---|---|---|
| 2005/0167484 A1 | 8/2005 | Sussman |
| 2013/0214043 A1 | 8/2013 | Kong et al. |

\* cited by examiner

GENERATING AN IDENTITY DOCUMENT WITH PERSONALIZATION DATA AND UNIQUE MACHINE DATA

RELATED APPLICATIONS

This application claims priority to Provisional Application Ser. No. 62/039,147, filed on Aug. 19, 2014, having inventors Mark Andrew Joynes et al., titled "GENERATING AN IDENTITY DOCUMENT WITH PERSONALIZATION DATA AND UNIQUE MACHINE DATA", and is incorporated herein by reference.

BACKGROUND OF THE DISCLOSURE

The disclosure relates generally to identity documents and more particularly to methods and apparatus for generating an identity document.

Security measures are of significant importance for systems and/or devices that generate and validate identity documents such as, for example, Machine Readable Travel Documents (MRTDs) (e.g., passports, visas, etc.), security badges, employee keycards, and financial cards (e.g., credit cards, debit cards, various types of store loyalty cards, etc.). In the absence of robust security measures when generating and validating identity documents, it may not be possible to determine, for example, when such documents include forgery or are the result of the use of unauthorized devices and/or systems that generate such documents.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Briefly, methods and apparatus for generating an identity document (e.g., a passport, other government ID, driver's license, security badge, keycard, financial card, etc.) are disclosed. In one embodiment, a method and identity document generation system (e.g., a system that includes a machine with a printing system, which may sometimes be referred to as a "printing mechanism") obtain unique machine data related to the identity document generation system, such as a machine identifier (ID) such as a printed circuit board identifier (ID), digital processor ID or other document generation system component ID that is globally unique, e.g., that will not be an ID related to any other authorized identity document generation system. The globally unique ID may also be obtained in any other suitable manner, such as by obtaining the globally unique ID by way of obtaining a collection of static elements from various components of the system that contribute to a value with sufficient entropy to assure a unique reproducible identity The methods and apparatus may also obtain personalization data related to an intended holder of the identity document, such as, for example, a name, birth date, Social Security number, address, Machine Readable Zone (MRZ) data of a passport, combinations of the foregoing personalization data, and/or any other suitable personalization data, which may depend on the type of identity document to be generated.

Additionally, the methods and apparatus may generate a unique machine and personalization data object. The unique machine and personalization data object, in one example, includes values of the unique machine data and the personalization data. The methods and apparatus may then digitally sign the unique machine and personalization data object. If desired, the methods and apparatus may generate a hash value from the unique machine and personalization data object, and may digitally sign the hash value. The methods and apparatus may digitally sign the unique machine and personalization data object, or in some embodiments the hash value generated therefrom, using a cryptographic engine (e.g., programmed processor, discrete logic or other circuitry) of the identity document generation system that provides a secure signing operation that binds a machine ID to personalization data of a holder of the document generated from the machine that generated the document. The cryptographic engine circuit may also be referred to as secure signing function (SSF). The methods and apparatus may also incorporate the signed unique machine and personalization data object, or in some embodiments the hash value generated therefrom, into the identity document. Further embodiments of the methods and apparatus, and additional and/or alternative methods and/or apparatus, are described in further detail below.

Among other advantages, for example, the disclosed methods and apparatus allow for robust security in the generation and subsequent validation of identity documents such as, for example, passports, other government IDs, licenses, employee badges, keycards, and financial cards (e.g., credit cards, debit cards, various types of store loyalty cards, etc.). The signed unique machine and personalization data pairs the personalization data related to the intended holder of the identity document with the specific identity document generation system authorized to generate the identity document. This pairing and the integrity of the personalization data (sometimes hereafter referred to as "perso data") may then be confirmed during a subsequent validation process, as further described below, in order to confirm authenticity of the identity document. The use of a globally unique ID for the identity document generation system (e.g., a system that includes a machine with a printing system) ensures that, for example, other purchasers of the same model printing system cannot generate a valid identity document, because the validation process described herein will indicate that the perso data is not paired with the specific identity document generation system that is authorized to generate the identity document (e.g., a customer-authorized or government-authorized system). Other advantages will be recognized by one of ordinary skill in the art.

Figure 1:
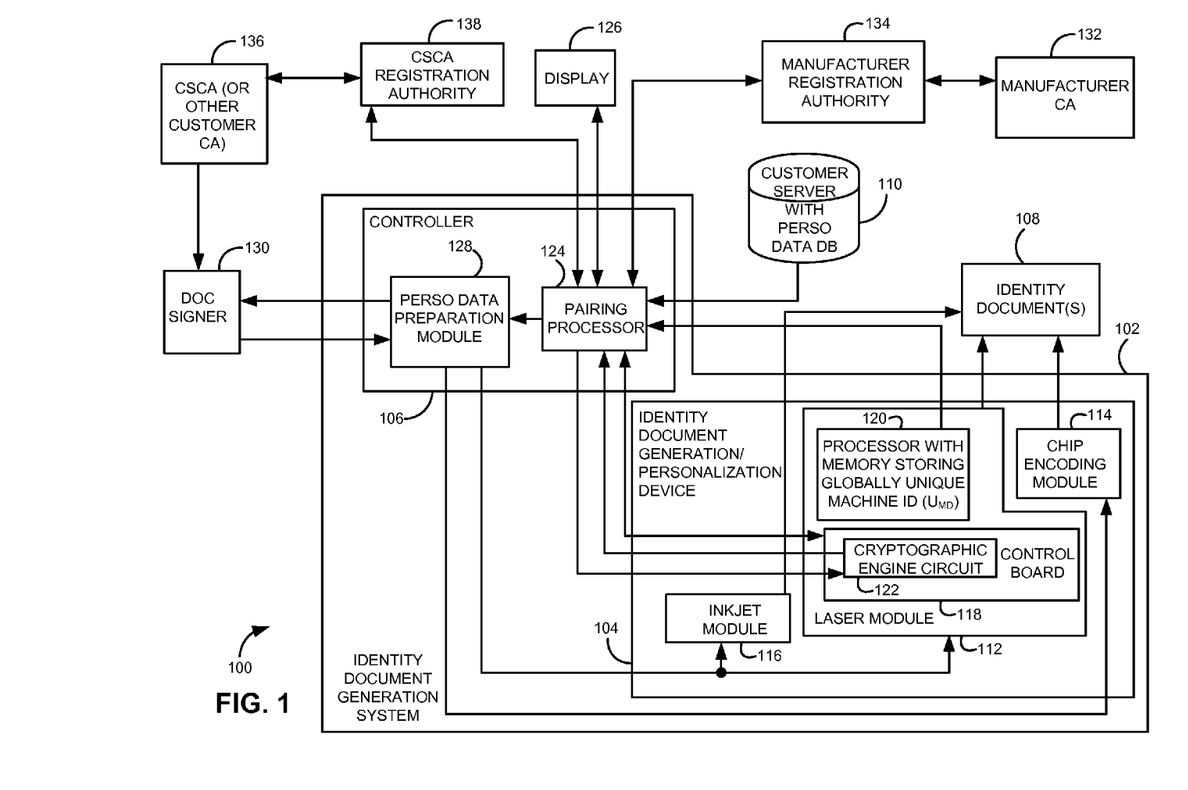
FIG. 1 is a functional block diagram illustrating an example of an identity document generation environment.

FIG. 1 is a functional block diagram illustrating an example of an identity document generation environment 100. The example identity document generation environment 100 includes an identity document generation system 102, such as a passport generation system, other government ID generation system, employee badge generation system, keycard generation system, financial card generation system, etc. Passport production systems and methods are also generally described in U.S. Pat. No. 6,783,067, issued on Aug. 31, 2004 and entitled "PASSPORT PRODUCTION SYSTEM AND METHOD," which is hereby incorporated by reference herein in its entirety.

As shown in FIG. 1, the identity document generation system 102 includes an identity document generation/personalization device 104 (e.g., a printing system) and a controller 106. In other examples, the identity document generation system 102 may be considered to be the identity document generation/personalization device 104 with the controller 106 being distinct therefrom. In still other examples, the controller 106 may be implemented within the identity document generation/personalization device 104. The identity document generation system 102 causes an identity document 108 to include a pairing of personalization data related to the intended holder of the identity document with the specific identity document generation system 102 authorized to generate the identity document 108. The example identity document generation environment 100 further includes a customer server with a perso data database 110 that provides perso data to the controller 106 as further described below.

The identity document generation/personalization device 104 may include a laser module 112 and a chip encoding module 114. In some embodiments, the identity document generation/personalization device 104 may include an inkjet module 116. In an embodiment where, for example, the identity document generation/personalization device 104 is or includes a machine with a laser printing system, the laser module 112 may include a control board 118 and a processor with memory 120 where the memory stores a globally unique machine identifier ($U_{MD}$). The control board 118 may include a cryptographic engine circuit 122 (e.g., programmed processor, discrete logic, or other circuitry), such as a Federal Information Processing Standard 140-2 cryptographic engine that provides a secure signing operation that binds $U_{MD}$ to personalization data (PD) of an intended holder of the identity document 108. As noted above, the cryptographic engine circuit 122 may also be referred to as a Secure Signing Function (SSF). In other examples, the cryptographic engine circuit 122 may be included in other suitable locations in the identity document generation environment 100. For example, the cryptographic engine circuit 122 may be included in the controller 106.

The controller 106 may include a pairing processor 124 that controls the pairing of the personalization data with the identity document generation system 102 as further described herein. The pairing processor 124 may be in communication with a display 126 that may be external to the controller 106 (as shown in FIG. 1) or integral with the controller 106. The controller 106 may also include a perso data preparation module 128, which may be in communication with a document signer 130 or "doc signer" 130. The doc signer 130, as discussed below, is to be used when the pairing of the personalization data with the identity document generation system 102 is included in the signed content of a chip or other memory device of the identity document 108.

As shown in FIG. 1, the example identity document generation environment 100 also includes a manufacturer certificate authority (CA) 132, a manufacturer registration authority (RA) 134, a country signing CA (CSCA) (or other customer CA) 136, and a CSCA registration authority 138. In examples where it is permissible for the cryptographic engine circuit 122 to use a private key of a manufacturer of the identity document generation system 102 or a manufacturer of the identity document generation/personalization device 104, the cryptographic engine circuit 122 with SSF may issue a request to the manufacturer RA 134, via a bidirectional communication link with the pairing processor 124, for the manufacturer's Public Key Certificate. The manufacturer RA 134 may then cause the manufacturer CA 132 to issue the manufacturer's Public Key Certificate by way of a bidirectional communication link between the manufacturer RA 134 and the manufacturer CA 132, such as, in a preferred embodiment, a wireless communication link over an air gap between the manufacturer RA 134 and the manufacturer CA 132. The request and/or key issuance may also be manual (e.g., offline by way of a manual link) instead of by way of an online automated link. Other links discussed herein may also be manual or automated as desired and/or suitable. The manufacturer's Public Key Certificate may then be issued to the cryptographic engine circuit 122 via the same bidirectional communication links in the direction toward the cryptographic engine circuit 122. Key exchange and digital signing as described herein may be of any suitable type. For example, the methods and apparatus/systems described herein may employ elliptic curve cryptography (ECC), RSA, or any suitable technique(s).

It may be permissible for the cryptographic engine circuit 122 with SSF to use a private key of a manufacturer to pair the personalization data with the identity document generation system 102 when the identity document 108 is, for example, a keycard, an employee badge, etc. This permission may, for example, be indicated by way of the control board 118 or the processor with memory 120. However, it may not be permissible for the cryptographic engine circuit 122 to use a private key of the manufacturer of the identity document generation system 102 when, for example, the identity document 108 is a document such as a passport, government ID, driver's license, a financial card (depending upon requirements of the issuer of the financial card), etc. Under this circumstance, the entity (e.g., government) that issues the identity document 108 to its intended holder may indicate that the CSCA 136 is to issue a Public Key Certificate of the issuing entity (e.g., issuing government) or a Public Key Certificate otherwise associated with the issuing entity. As such, the cryptographic engine circuit 122 may issue a request to the CSCA RA 138, via the bidirectional communication link with the pairing processor 124, for the issuing entity's Public Key Certificate. The CSCA RA 138 may then cause the CSCA 136 to issue the Public Key Certificate of the entity (e.g., government) by way of a bidirectional communication link between the CSCA RA 138 and the CSCA 136. The issuing entity's Public Key Certificate may then be issued to the cryptographic engine circuit 122 via the same bidirectional communication links in the direction toward the cryptographic engine circuit 122.

In generating the identity document 108, the pairing processor 124 may in some examples obtain unique machine data $U_{MD}$ (e.g., a globally unique ID as discussed above) related to the identity document generation system 102. In a preferred embodiment, the globally unique ID may be obtained from the identity document generation system 102 itself. In another examples, the globally unique ID may be obtained from a concatenation of static elements from various components of the system that contribute to a value with sufficient entropy to assure a unique reproducible identity. The pairing processor may then send a random challenge to the cryptographic engine circuit 122. The cryptographic engine circuit 122 may digitally sign the random challenge using a private key associated with the cryptographic engine circuit 122, which in cases where the identity document generation system 102 is authentic will be the private key of either the manufacturer or the issuing entity of the identity document 108. The cryptographic engine circuit 122 may then return the signed random challenge to the pairing processor 124. The pairing processor 124 may use the Public Key Certificate of either the manufacturer or the issuing entity, obtained as described above, to confirm that the cryptographic engine circuit 122 is using the private key that corresponds to the Public Key Certificate and, thus, is providing the proper SSF and is authorized for use in identity document generation.

In particular, the naming attributes of the Public Key Certificate used by the pairing processor 124 are configured, upon issuance of the Public Key Certificate as described above, to include the $U_{MD}$ for the identity document generation system 102. Accordingly, the pairing processor 124 may first read the naming attributes of the Public Key Certificate to determine the intended matching $U_{MD}$, and then assess whether the $U_{MD}$ returned with the signed random challenge matches that retrieved by the pairing processor 124 from the identity document generation/personalization device 104. With a match, for example, the same Public Key Certificate is also able to validate the digital signature applied to the random challenge, thereby proving the match of the machine (e.g., the identity document generation/personalization device 104 or the identity document generation system 102) to the cryptographic engine circuit 122 with SSF.

This described process for confirmation of the match of the machine to the cryptographic engine circuit 122 with SSF may be performed at the time of initial install of the identity document generation system 102 to ensure the correct pairing. This process may also be performed at each "start-up" to ensure continued integrity (e.g., continued match) for the identity document generation system 102. This process may also be used on the submission of each print job, e.g., each job involving one or a batch of documents/data, to maintain assurance that the machine/cryptographic engine circuit 122 pairing has integrity.

With reference to the discussion above, the cryptographic engine circuit with SSF and/or any other "circuit," "logic," "module," etc. described herein may be, for example, implemented as a processor(s) executing suitable instructions, or may be implemented by storing executable instructions on a computer readable storage medium where the executable instructions are executable by one or more processors to cause the one or more processors to perform the actions described herein, or may be implemented in hardware or any other suitable manner including any suitable combination of the example manners described above.

Once the aforementioned confirmations have been made to indicate that the SSF provided by the cryptographic engine circuit 122 is the proper SSF and is authorized for use in identity document generation, identity document generation may proceed, for example, as follows. In describing this example identity document generation, reference will also be made to FIG. 2, which is a flowchart of an example method for generating an identity document.

Figure 2:
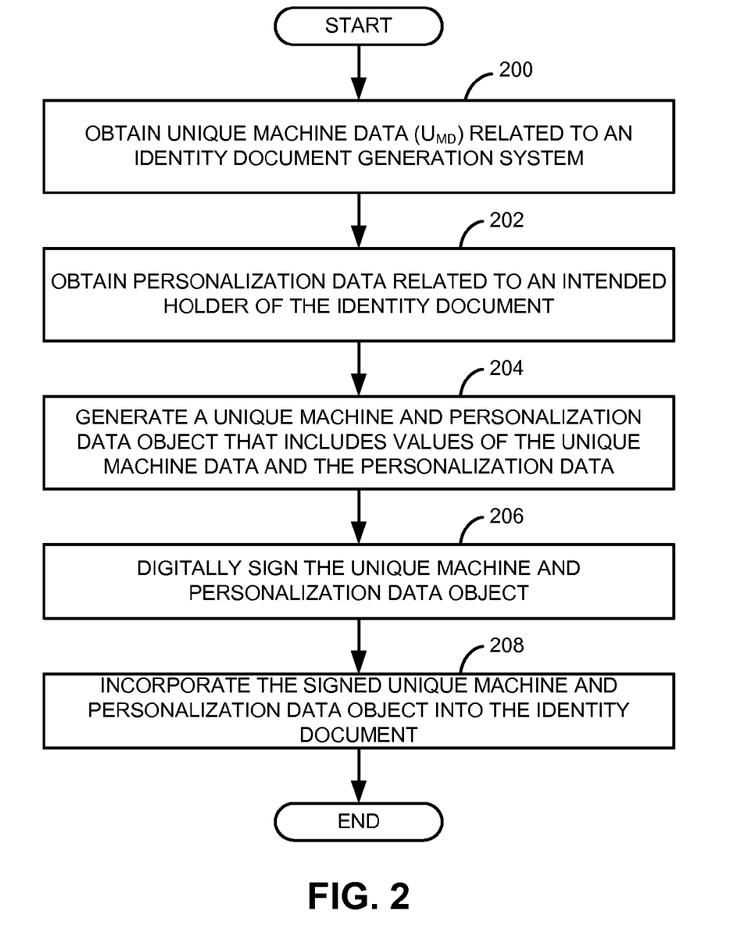
FIG. 2 is a flowchart of an example method for generating an identity document.

The method illustrated in FIG. 2, and each of the example methods described herein, may be carried out by one or more suitably programmed controllers or processors executing software. The method may also be embodied in hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the method(s) is/are described with reference to the illustrated flowcharts (e.g., in FIG. 2), it will be appreciated that many other ways of performing the acts associated with the method(s) may be used. For example, the order of some operations may be changed, and some of the operations described may be optional. Additionally, while the method(s) may be described with reference to the example identity document generation environment 100 and/or identity document generation system 102, it will be appreciated that the method(s) may be implemented by other devices and/or systems as well, and that the identity document generation environment 100 and/or identity document generation system 102 may implement other methods.

As shown in FIG. 2, the method begins at block 200 when unique machine data $U_{MD}$ related to the identity document generation system 102 is obtained by, for example, the pairing processor 124 as described above. As shown in block 202, personalization data PD related to an intended holder of the identity document is obtained. For example, the personalization data or "perso data" may be obtained by the pairing processor 124 from the customer server with perso data database 110. With reference to the discussion above, the customer may be the entity that issues the identity document 108, such as a government entity in the case of a passport.

As shown in block 204, a unique machine and personalization data object is generated that includes values of the unique machine data and the personalization data. For example, the unique machine and personalization data object may be or may include a concatenation of $U_{MD}$ and PD. In one embodiment, the pairing processor 124 may generate the unique machine and personalization data object.

As shown in block 206, the unique machine and personalization data object may be digitally signed. For example, the pairing processor 124 may communicate the unique machine and personalization data object to the cryptographic engine circuit 122 with SSF via a one-way communication link (which, like all communication links described herein, may be any suitable communication link including any suitable wired or wireless communication link). The cryptographic engine circuit 122 may then use the SSF to sign the unique machine and personalization data object using the private key that has been associated with the SSF 122 by way of obtaining the appropriate corresponding Public Key Certificate (e.g., manufacturer Public Key Certificate or customer Public Key Certificate) as described above. The signed unique machine and personalization data object may be denoted $S_{MPF}$ with "MPF" reflecting that the unique machine and personalization data object may also be referred to as a "machine-perso fingerprint," e.g., a data object in which the personalization data and $U_{MD}$ are bound or paired together, such as by concatenation.

Figure 3:
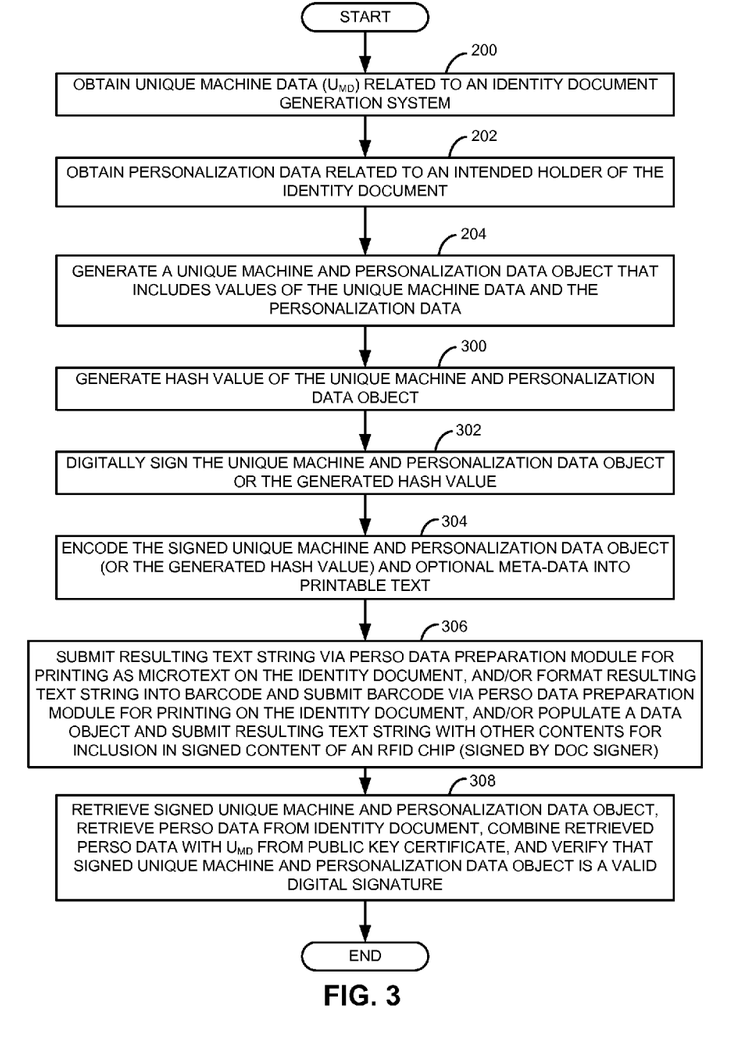
FIG. 3 is a flowchart of another example method for generating an identity document.

The signed unique machine and personalization data object $S_{MPF}$ may be returned to the pairing processor 124 via a one-way communication link (or, in another embodiment, via a two-way communication link also used to communicate the unique machine and personalization data object to the cryptographic engine circuit 122 for signing) and may be incorporated into the identity document, as shown in block 208 and as further discussed with respect to FIG. 3.

With continued reference to FIG. 1 and turning now to FIG. 3, FIG. 3 is a flowchart of another example method for generating an identity document. It will be appreciated from the following disclosure that portions of FIG. 3 illustrate further details of one or more example implementations of the method shown and described with respect to FIG. 2. As shown in FIG. 3, the method may include the acts described with respect to blocks 200, 202, and 204 of FIG. 2. As shown in block 300, the method may include generating a hash value of the unique machine and personalization data object, which may be denoted $H_{MPF}$. However, as with other acts described with respect to the methods in FIGS. 2 and 3, block 300 may be optional and the hash value $H_{MPF}$ may not be generated.

As shown in block 302, the method may include digitally signing the unique machine and personalization data object, or the generated hash value if block 300 is performed, to generate a cryptographic object $S_{MPF}$ as also discussed with respect to FIG. 2. As shown in block 304, the method may include encoding $S_{MPF}$ and, in some cases, meta-data such as date and/or time, into a printable text string. In an example, the encoding of $S_{MPF}$ and optional meta-data may be performed by the pairing processor 124.

As shown in block 306, the method may include submitting the resulting text string via the perso data preparation module 128, which may format the resulting text string for printing on the identity document 108. It will be appreciated that the identity document generation system 102 may generate more than one identity document 108 for more than one person, e.g., the identity document generation system 102 may generate a stack or other grouping of passports or other identity documents, each with the aforementioned pairing for more robust security. In any event, the perso data preparation module 128 may format the resulting text string for printing as microtext on the identity document 108, and in some embodiments, the pairing processor 124 may also or alternatively format the text string as a barcode and submit the barcode information to the perso data preparation module 128. The perso data preparation module 128, in turn, may format the resulting information to be sent to the identity document generation/personalization device (e.g., machine with a printing system) 104 for printing on a surface of the identity document 108.

Still further, in some embodiments, the pairing processor 124 may also or alternatively populate a data object and submit the resulting text string for inclusion in the signed content of a chip or other memory device to be included in the identity document 108. If desired, the pairing processor 124 may populate a data object and submit the resulting text string with other suitable contents, such as a signed data object in a formatted optional Data Group with one or more other Data Groups, such as those standardized by the International Civil Aviation Organization (ICAO) for inclusion in the signed content of a chip or other memory device in an electronic Machine Readable Travel Document (eMRTD) (e.g., passport) that constitutes the identity document 108.

The chip or other memory device may be, for example, an RFID chip, a microSD chip that may be used in, for example, a financial card, or any suitable chip or other memory device. More particularly, the signed content of the chip or other memory device may be sent from the pairing processor 124 to the perso data preparation module 128 to the doc signer 130, and thus as may be seen from FIG. 1 the signed content of the chip or other memory device may be signed by the private key of the customer. The perso data preparation module 128 may be responsible for formatting part or all of the contents of the signed data object for the chip or other memory device, where the specific signed object may form the contents of just one datagroup. Such an implementation may be desirable for some generalized ePassport systems where the signed unique machine and personalization data feature may be included in the signed object. For example, in a preferred embodiment, Data Group 13 (DG13) may be populated and other Data Groups may be appropriately configured. In some embodiments, a hash of the entire contents may be submitted to the doc signer 130. The signed content of the chip or other memory device may then be sent to the chip encoding module 114 for insertion into the identity document 108.

As shown in block 308, the method may also include retrieving the $S_{MPF}$, which, as discussed above, is either the signature of the combined unique machine data and personalization data object or the signature of the hash thereof, retrieving the perso data (sometimes referred to as "PD") from the identity document 108, combining the PD with $U_{MD}$ as obtained from the naming attributes of the applicable Public Key Certificate, and verifying that the $S_{MPF}$ is a valid digital signature, using the combined PD and $U_{MD}$ and the public key obtained from the applicable Public Key Certificate. If the signature is found to be valid, then the authenticity of the identity document 108, and, more particularly, the pairing between the personalization data related to the intended holder of the identity document with the specific identity document generation system 102, is confirmed. If the signature is not found to be valid, the identity document generation system 102 may not be the identity document generation system authorized for use in generating the identity document 108, and/or the personalization data may not be the personalization data authorized for use with the identity document generation system 102 in generating the identity document 108. Moreover, in a preferred embodiment, if the signature is not found to be valid, the identity document generation system 102 may be prevented from operating, thereby ensuring it could not be used in conjunction with the signed unique machine and personalization data feature if, for example, the identity document generation system 102 is stolen from a supply chain.

Figure 4:
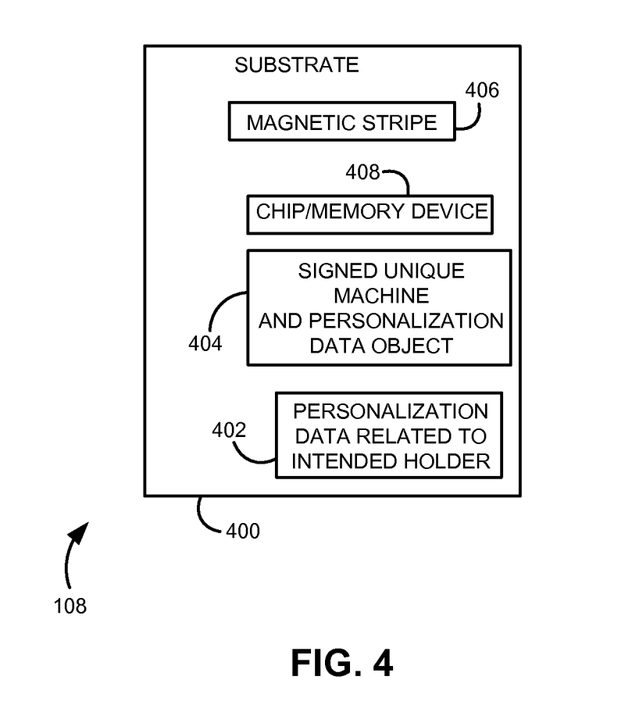
FIG. 4 illustrates an example identity document generated by an identity document generation system such as an identity document generation system as illustrated in FIG. 1.

FIG. 4 illustrates an example identity document 108 generated by an identity document generation system, such as the identity document generation system 102. As shown in FIG. 4, the identity document 108 may include a substrate 400, which may be, for example, a page of a passport that contains other elements of the identity document 108 as described below. In another example, the substrate 400 may be the material upon which components of a government ID, driver's license, financial card, or other suitable identity document (such as the example types of identity documents described herein) are disposed.

With reference to the discussion above, personalization data 402 (e.g., name, address, etc.) related to the intended holder of the identity document may be printed on the substrate 400. The personalization data 402 may be the same as or different from the personalization data used to generate the signed unique machine and personalization data object. Another element 404 on the substrate 400 may be the signed unique machine and personalization data object. In some embodiments, with reference to the discussion above, the element 404 may be a signed hash, an encoding of the signed unique machine and personalization data object, etc.

If desired, the substrate 400 may also include a magnetic stripe 406, such as but not limited to the situation where the identity document 108 is a financial card. The signed unique machine and personalization data object may be incorporated into the magnetic stripe 406 in a manner similar to the above-described printing of a barcode on the identity document 108. The substrate 400 may further include a chip or other suitable memory device 408, such as an RFID chip, microSD chip, or any suitable chip or memory device as described above. The chip or other memory device 408 may include signed content that includes a signed text string and other suitable contents as discussed above.

Among other advantages, for example, the disclosed methods and apparatus allow for robust security in the generation and subsequent validation of identity documents such as passports, other government IDs, licenses, employee badges, keycards, financial cards, etc. The signed unique machine and personalization data pairs the personalization data related to the intended holder of an identity document with the specific identity document generation system authorized to generate the identity document. The use of a globally unique ID for the identity document generation system ensures that other purchasers of the same model printing system cannot generate a valid identity document, because the validation process will indicate that the personalization data is not paired with the specific identity document generation system that is authorized to generate the identity document.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of generating an identity document using an identity document generation system comprising:
   obtaining unique machine data related to the identity document generation system;
   obtaining personalization data related to an intended holder of the identity document;
   generating a unique machine and personalization data object that includes values of the unique machine data and the personalization data;
   generating a hash value from the unique machine data and personalization data;
   digitally signing the hash value from the unique machine and personalization data object using a private signing key associated with at least one of a manufacturer of the identity document generation system, the identity document generation system or an issuing entity of the identity document; and
   incorporating the signed unique machine and personalization data object into the identity document.

2. The method of claim 1, wherein the identity document comprises a passport, a government ID or a license.

3. The method of claim 1, wherein incorporating the signed unique machine and personalization data object comprises formatting the signed unique machine and personalization data object into a two dimensional bar code and printing the two dimensional bar code on the identity document.

4. The method of claim 1, wherein incorporating the signed unique machine and personalization data object comprises encoding the signed unique machine and personalization data object into printable text and printing the printable text on a surface of the identity document.

5. The method of claim 1, wherein incorporating the signed unique machine and personalization data object comprises writing the signed unique machine and personalization data object to a memory device of the identity document.

6. The method of claim 5, wherein the memory device comprises an RFID chip.

7. The method of claim 1, wherein the personalization data is selected from the group consisting of a birth date, Social Security number, name, address, machine readable zone (MRZ) data and combinations thereof.

8. The method of claim 1, wherein the signed unique machine and personalization data object is incorporated into the identity document in a machine readable form.

9. The method of claim 1, wherein the unique machine data comprises a serial number or a collection of static data elements to establish a unique machine identity.

10. The method of claim 1 further comprising printing the personalization data on a surface of the identity document.

11. The method of claim 1 further comprising printing a photo of the intended holder of the identity document on a surface of the identity document.

12. An identity document comprising:
    a substrate;
    personalization data related to an intended holder of the identity document printed on a surface of the substrate; and
    unique machine and personalization data, digitally signed using a private signing key associated with using a private signing key associated with at least one of a manufacturer of the identity document generation system, the identity document generation system or an issuing entity of the identity document, wherein the unique machine and personalization data comprises a unique machine and personalization data object that includes a hash value of unique machine data related to a document generation system used to generate the identity document and personalization data related to the intended holder of the identity document.

13. The identity document of claim 12, wherein the personalization data of the unique machine and personalization data object is selected from the group consisting of a photo, birth date, Social Security number, name, address, machine readable zone (MRZ) data, and combinations thereof.

14. The identity document of claim 12 wherein the unique machine and personalization data is contained in a two dimensional bar code.

15. An identity document comprising a substrate, the document conveying a portrait image, text information, a digital signature of a hash value from unique machine and personalization data, wherein the unique machine and personalization data includes unique machine data related to a document generation system used to generate the identity document and personalization data related to an intended holder of the identity document.

16. A document generation system for generating a multiple page, bound document comprising:
    an input mechanism constructed to hold a plurality of bound documents to be personalized;
    a personalization mechanism operatively coupled to the input mechanism, the personalization mechanism configured to perform a personalization operation on a page of the document; and
    a controller operatively coupled to the personalization mechanism and configured to generate unique machine and personalization data, wherein the unique machine and personalization data comprises a unique machine and personalization data object that includes unique machine data related to the document generation system and personalization data and configured to generate a hash value from the unique machine data and personalization data and configured to digitally sign the hash value from the unique machine and personalization data object using a private signing key associated with at least one of a manufacturer of the identity document generation system, the identity document generation system or an issuing entity of the identity document.

17. The system of claim 16 wherein the personalization mechanism comprises a printer mechanism that is configured to perform printing on a page of the document.

18. The system of claim 16 further comprising a second personalization mechanism.

19. The system of claim 16 further comprising a storage device configured to store the personalization data.

20. A method of generating an identity document using an identity document generation system comprising:
    obtaining unique machine data related to the identity document generation system;
    obtaining personalization data related to an intended holder of the identity document;
    generating a unique machine and personalization data object that includes values of the unique machine data and the personalization data;
    digitally signing the unique machine and personalization data;
    incorporating the signed unique machine and personalization data object into the identity document;
    wherein incorporating the signed unique machine and personalization data object comprises writing the signed unique machine and personalization data object to a memory device of the identity document; and
    wherein the memory device comprises an RFID chip.

21. A method of generating an identity document using an identity document generation system comprising:
    obtaining unique machine data related to the identity document generation system;
    obtaining personalization data related to an intended holder of the identity document;
    generating a unique machine and personalization data object that includes values of the unique machine data and the personalization data;
    digitally signing the unique machine and personalization data object using a private signing key associated with at least one of a manufacturer of the identity document generation system, the identity document generation system or an issuing entity of the identity document;
    incorporating the signed unique machine and personalization data object into the identity document;
    writing the signed unique machine and personalization data object to a memory device of the identity document; and
    wherein the memory device comprises an RFID chip.

22. A document generation system for generating a document comprising:
    a controller configured to:
        obtain unique machine data related to the identity document generation system;
        obtain personalization data related to an intended holder of the identity document;
        generate a unique machine and personalization data object that includes values of the unique machine data and the personalization data;
        digitally sign the unique machine and personalization data;
        incorporate the signed unique machine and personalization data object into the identity document;
        wherein incorporating the signed unique machine and personalization data object comprises writing the signed unique machine and personalization data object to a memory device of the identity document; and
        wherein the memory device comprises an RFID chip.

* * * * *